April 29, 1941.  A. C. WESTBY  2,239,802

FISH LURE

Filed June 9, 1939

Inventor
Adolph C. Westby
By Williamson & Williamson
Attorneys

Patented Apr. 29, 1941

2,239,802

UNITED STATES PATENT OFFICE 2,239,802

FISH LURE

Adolph C. Westby, Long Beach, Calif.

Application June 9, 1939, Serial No. 278,238

5 Claims. (Cl. 43—46)

This invention relates to fish lures or artificial baits, and particularly to a lure which will closely simulate the movements of small fish or minnows in the water.

It is an object to provide a simple, inexpensive and highly efficient fish lure which may be successively utilized for casting, trolling, still fishing, or drop fishing, and which closely simulates gliding or darting movements of small fish as well as wriggling movements when in use.

It is a further object to provide a fish lure of the class described wherein slight up and down movements or pulls on the lines will produce smooth, gliding or darting of the lure in an arcuate path, and whereby when the lure is used for trolling, a combined darting and wriggling movement is produced.

Most fish lures widely used at this time when pulled through the water assume a wobbling or jerky movement, usually from side to side. With my improved device a very smooth, arcuate gliding movement is obtained, simulating closely the quick darting of small fish when in danger.

The preferred embodiment of my invention is so constructed as to be attached to a line in different manners for different types of fishing to produce successful results.

The foregoing and other objects and advantages of my invention will be more apparent from the following description made in connection with the accompanying drawing, wherein like reference characters refer to the same parts throughout the several views, and in which.

The embodiment illustrated is shaped to simulate a small fish or minnow having an elongated, relatively thin body provided with a head 7 and a tail 8.

It will, of course, be understood that the invention is not limited to a shape simulating a fish, but that various shapes and simulations of live bait may all be used within the scope of my invention.

For under water use, the body 7 may conveniently be constructed of metal and the upper edge thereof is considerably thinner than the lower edge of the forward portion, the body increasing in thickness throughout the forward and central portions from the upper edge to the lower edge. It is important that the greater part of the weight be disposed below the longitudinal center line of the body. It is also desirable to have the head portion slightly overbalance the remainder of the body on a line taken through the transverse center line of the body.

Figure 1:
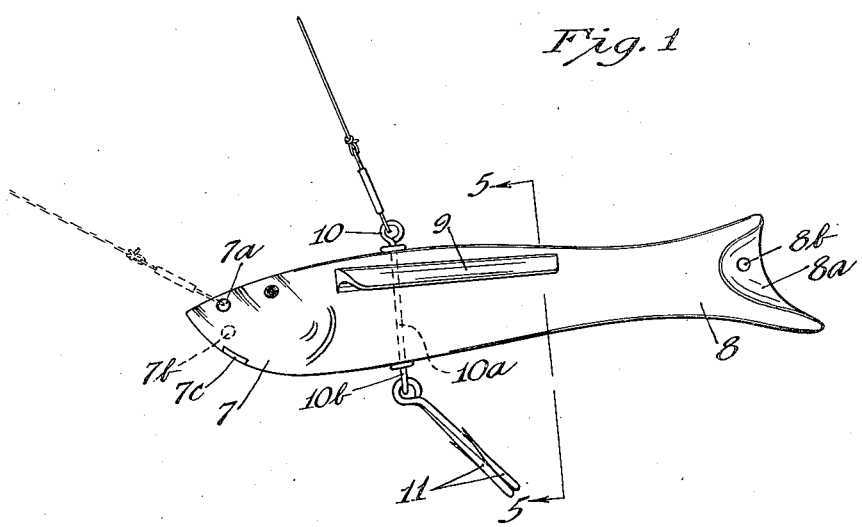
Fig. 1 is a side view of an embodiment of my improved lure attached to a leader.

A pair of aligned, longitudinally extending gliding wings 9 are secured to and extend laterally from the central portion of the body, as shown, though not necessarily being rigidly constructed and rigidly secured to the body. These wings, as shown, are of arcuate cross section (see Figs. 1 and 4), and extend from the head for approximately one-third the length of the body, although the length and positioning of these wings may be considerably varied all within the scope of the appended claims.

Figure 2:
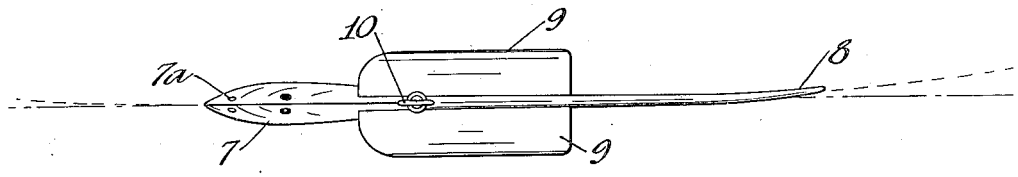
Fig. 2 is a top plan view of the same.
Figure 3:
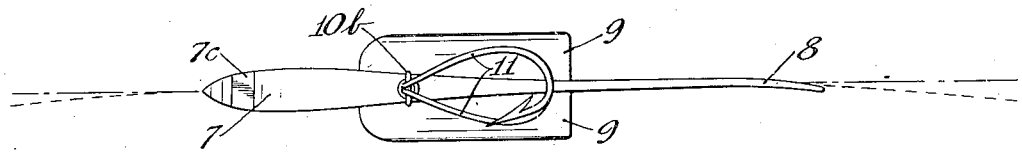
Fig. 3 is a bottom plan view.

The rear portion of the body including the tail is slightly curved or otherwise constructed to cause the body when dragged through the water to travel in an arcuate course. (See Figs. 2 and 3.) This may also be effected or accentuated by slightly concaving one surface of the tail portion at 8a.

I preferably provide means for attachment of a line or leader at several points on the lure, depending upon the type of fishing for which the lure is to be used. As shown, the aperture 7a is formed in the nose of the head for attachment of the line or leader when comparatively fast trolling is desired. In larger sizes of the bait an additional hole 7b, indicated by the dotted lines, may be employed for varying the depth of the lure.

For still fishing or very slow trolling and the most effective type of casting, the line may be attached to an eye or analogous attachment member 10 which in the embodiment shown is secured to the upper end of a pin 10a passing transversely through the body and having at its lower end an eye 10b to which a hook or hooks 11 may be swingably connected.

Figure 4:
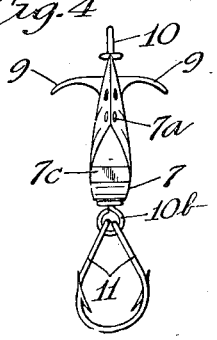
Fig. 4 is a front end elevation.
Figure 5:
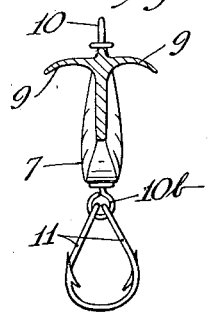
Fig. 5 is a cross section taken on the line 5—5 of Fig. 1.

I have devised a combination of hooks which I believe novel and which are particularly effective to reduce snagging, while nevertheless being as effective as any other arrangement in engaging the mouth of a fish. As shown in Figs. 4 and 5, two hooks are disposed on the eye 10b having their shanks crossed in normal position and with the turned and barbed ends oppositely disposed. This reduces likelihood of the points engaging objects when the bait is drawn through the water, but when struck the bodies of the hooks readily move to expose the points.

For drop fishing where the bait is dropped from above the water in step by step manner, gliding in such action, I provide an aperture 8b in the tail portion of the lure for attachment of the line or leader.

While the embodiment illustrated has only one set of hooks attached, it is to be understood that for trolling, particularly in the longer sizes of bait, an additional set of hooks may be secured to the eye 8b of the tail in similar manner to the arrangement of hooks 11.

I find it is of advantage to inset a piece of glittering material 7c, such as mother-of-pearl, in the lower edge of the head or nose portion of the lure, the reflections from this piece serving to further attract fish at some distance.

When used for still fishing or, if desired, for casting, short pulls may be imposed upon the line, causing the bait to smoothly glide or dart in an arcuate path. There is no wobbling movement in each of the glides, although if the lure is reeled in fast with a casting rod, the movement will be accompanied by a series of smooth darts or glides away from the straight line path of the line with intermittent movements toward the straight line of movement of the boat or rod. The wings 9 with the body balanced as enumerated are responsible for the smooth gliding movements and prevent downward dropping of the bait when pulled. It is essential that the greater weight be disposed well below the wings to prevent tilting of the body when the lure is pulled through the water.

In trolling with a steady pull on the lure, the movement consists in a series of arcuate glides in one direction with alternate wriggling action back to the line of pull between glides.

While my lure is particularly adapted for an under water bait, it may be constructed for surface fishing, in such instance the body being constructed of more or less buoyant form, and weighted at the lower portion in such manner that the wings will be disposed at or close to the surface of the water.

The sides of the body may, of course, be painted to more closely simulate the features, gills, scales, etc. of a fish or the parts of any other natural bait simulated.

It will, of course, be understood that various changes may be made in the form, details, arrangement and proportions of the parts without departing from the scope of my invention.

What is claimed is:

1. A fish lure comprising, an elongated, relatively thin body adapted to be disposed edgewise in the water and being heavier than the water displaced, said body having a pair of elongated, aligned gliding wings extending longitudinally thereof substantially parallel to the longitudinal center of gravity of said body and projecting laterally from adjacent the upper edge thereof at opposite sides, the lower portion of said body below the longitudinal center line being of considerably greater weight than that above said center line.

2. A fish lure comprising, an elongated body adapted to be disposed edgewise in the water and being heavier than the water displaced, said body having aligned, laterally projecting gliding wings adjacent the central and upper portion thereof extending substantially parallel to the longitudinal center line of said body, and having the greater part of its weight disposed below its wings, said body being balanced slightly heavier forwardly of the center of said wings, said body having means therein for attachment to a fishing line.

3. A fish lure comprising, an elongated, relatively thin body constructed of material heavier than water simulating the shape of a natural fish bait, said body increasing in thickness from its upper to its lower edge and having laterally projecting longitudinally disposed gliding wings extending in aligned relation from the central and upper portion thereof, said wings being of arcuate cross section with their convex surface disposed uppermost, and means for connecting said body with a fishing line.

4. A fish lure comprising, an elongated relatively thin body heavier along the lower portion thereof for disposal edgewise in the water and being heavier than the water displaced, said body having a pair of aligned gliding wings extending longitudinally thereof and projecting laterally therefrom, said body being shaped to cause with the cooperation of said gliding wings, travel without spinning in an arcuate path when drawn through the water.

5. A fish lure comprising, an elongated, relatively thin body adapted to be disposed edgewise in the water and being heavier than the water displaced, said body being balanced to maintain the same in substantially horizontal position when pulled below the surface of the water, said body having a pair of aligned, longitudinally extending gliding wings adjacent the upper edge thereof and extending substantially parallel to the longitudinal center line of said body, and said body from end to end being curved slightly to cause intermittent travel without spinning through arcuate paths when drawn through the water.

ADOLPH C. WESTBY.